Dec. 15, 1931.    A. F. NYE    1,836,387
SCREEN MOUNTING
Filed April 1, 1927    4 Sheets-Sheet 1
*Fig.1*
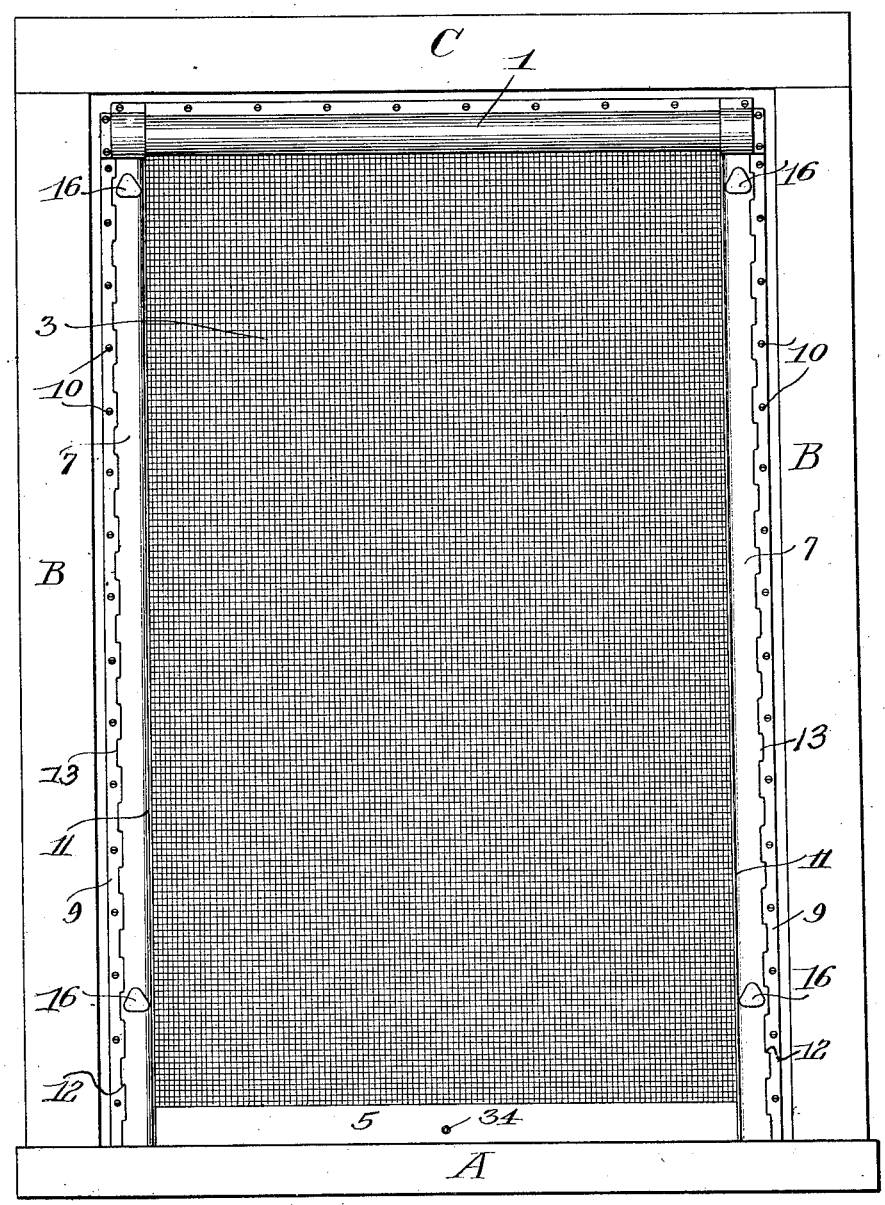
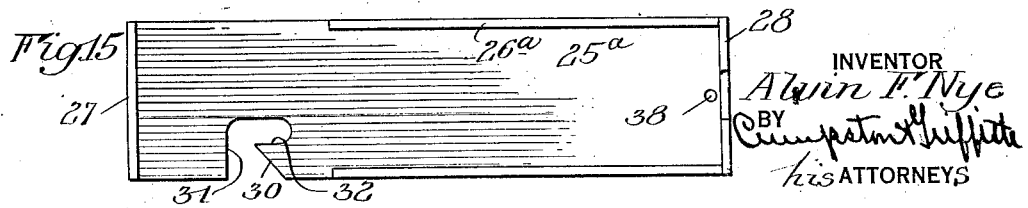
*Fig.15*
INVENTOR
Alvin F. Nye
BY
*his* ATTORNEYS Dec. 15, 1931.  A. F. NYE  1,836,387

SCREEN MOUNTING

Filed April 1, 1927  4 Sheets-Sheet 2

Fig. 2

INVENTOR
Alvin F. Nye
BY
his ATTORNEYS

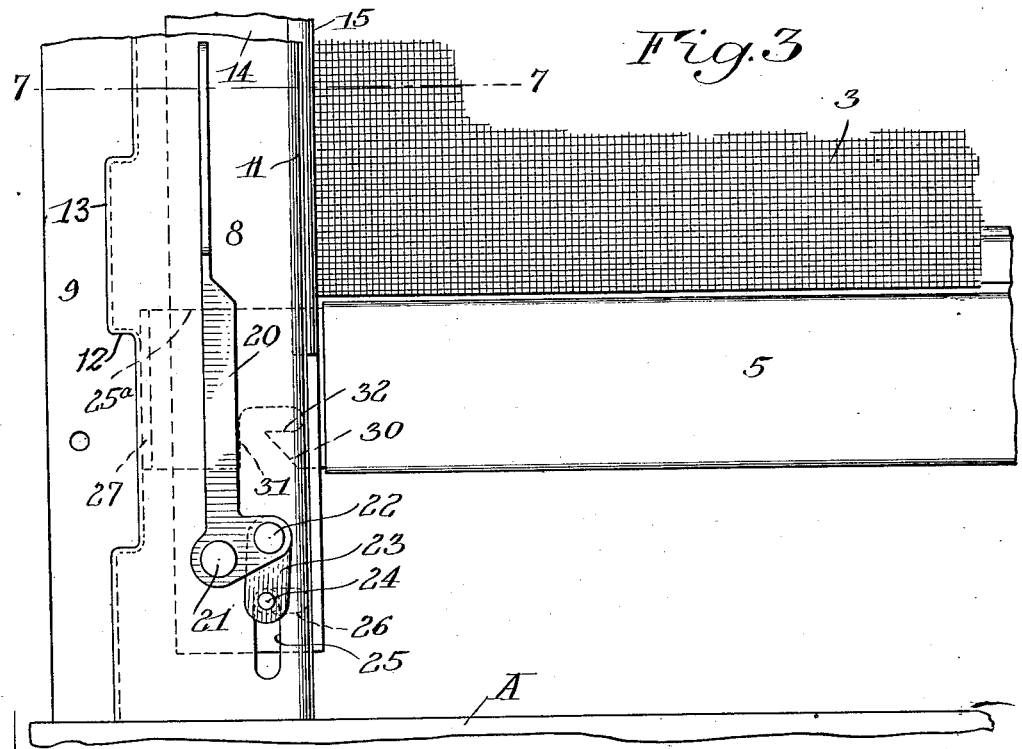
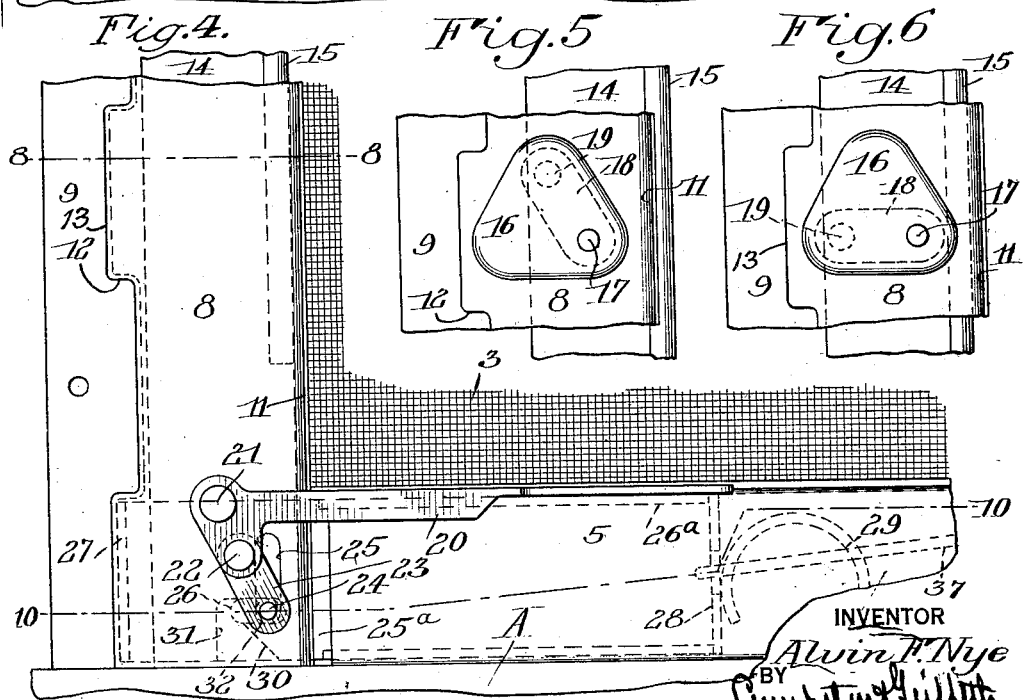
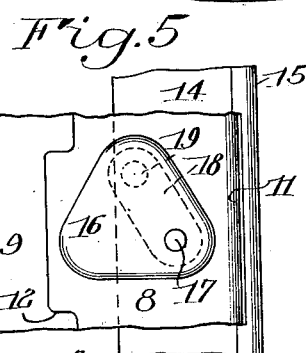
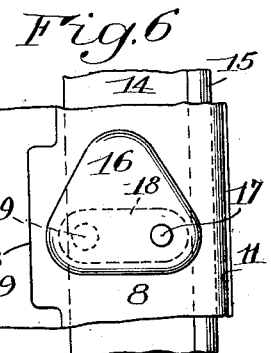

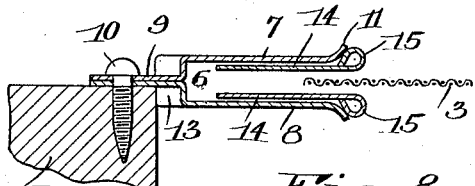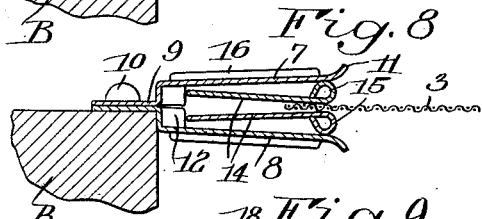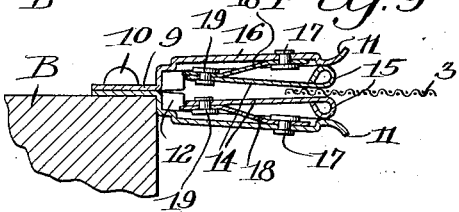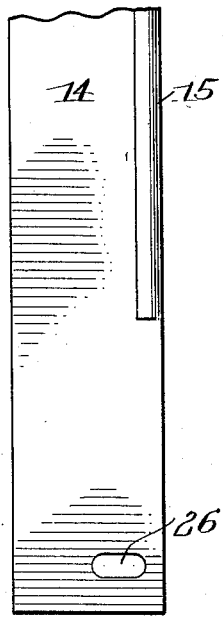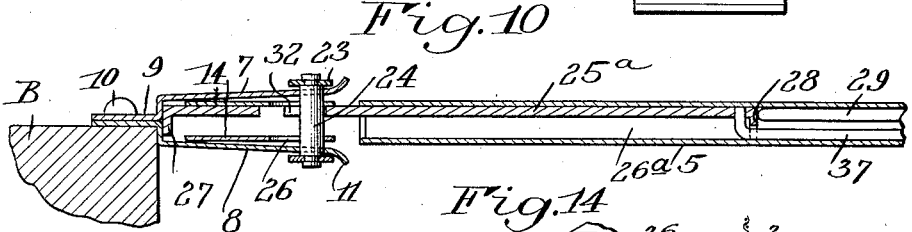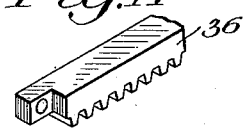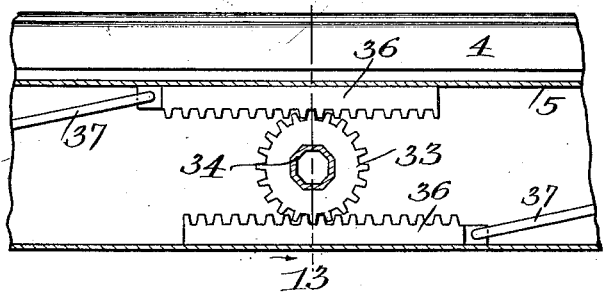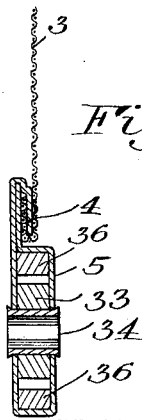

Patented Dec. 15, 1931

1,836,387

UNITED STATES PATENT OFFICE

ALVIN F. NYE, OF ROCHESTER, NEW YORK

SCREEN MOUNTING

Application filed April 1, 1927. Serial No. 180,122.

My present invention relates to movable screens and mountings therefor, such as the roller screens that are applied to windows and porches, and it has for its object to provide an improved simple, convenient and efficient screen and mounting of this character. The improvements are directed in part toward means for clamping and stretching the edges of the movable flexible screen and toward means for locking the screen in closed position and in different open positions.

To these and other ends the invention resides in certain improvements and combination of parts, all of which will be hereinafter more fully described, the novel features being pointed out in the claims at the end of this specification.

In the drawings:

Figure 1 is an exterior elevation of the screen and mounting constructed in accordance with and illustrating one embodiment of my invention;

Figure 2 is an inside enlarged elevation thereof, partly broken away and showing the spring roll casing in vertical section;

Figure 3 is an enlarged fragmentary view of a lower portion of the screen and mounting showing operating devices for locking and clamping the screen, the same being in inoperative position;

Figure 4 is a view similar to Figure 3 with the operating mechanism in operative position;

Figure 5 is an enlarged fragmentary view of a portion of one of the screen guides showing screen clamping parts in inoperative positions;

Figure 6 is a similar view showing the same parts in operative position;

Figure 7 is an enlarged fragmentary section on the line 7—7 of Figure 3;

Figure 8 is a similar section on the line 8—8 of Figure 4;

Figure 9 is a similar section on the line 9—9 of Figure 2;

Figure 10 is a fragmentary section on the line 10—10 of Figure 4;

Figure 11 is a fragmentary detail elevation of one of the screen clamping jaws;

Figure 12 is a fragmentary vertical section through the center of the bottom rail of the screen;

Figure 13 is a section on the line 13—13 of Figure 12;

Figure 14 is a fragmentary detail perspective view of one of the elements of the rail locking mechanism; and Figure 15 (Sheet 1) is an enlarged elevation of one of the spring latches of the bottom rail.

Similar reference numerals throughout the several views indicate the same parts.

I have shown and will describe my invention as applied to an ordinary window casing or frame embodying a still A, side pieces B and a top piece C. Secured to the top of the casing in a manner hereinafter more fully described is a spring roller housing, the body portion of which is indicated at 1, containing a spring roller indicated generally at 2, upon which the flexible wire or similar screening 3 is wound in the usual manner. The specific construction of these parts has nothing to do with the invention claimed herein which relates, rather, to the manner in which the screen is guided, clamped for stretching and secured in different positions in the window frame, said roller structure constituting the subject matter of my copending application, Serial No. 380,014, filed July 22, 1929.

The lower edge of the screen is secured in the manner shown in Figure 13 beneath a flange 4 projecting from the upper edge of a hollow rectangular rail piece 5 preferably of sheet metal construction. Rising from the sides of the sill A at each side of the frame is a channel member or guide 6 for the otherwise free edges of the screen. As the construction at each side of the window is the same, a description of one will suffice for both. This channel member 6 is preferably formed of sheet metal and in halves embodying spaced walls 7 and 8 (Figure 7) to receive the screen 3 which walls are brought together in superposed flange portions 9 fastened by screws 10 or otherwise to the side piece B of the window frame, so that the guides are offset and project within the frame. The walls at the open side of the channel are flared as at 11 to constitute cam surfaces, whereas the inner closed side is provided with a series of inner shoulders 12 (Figures 8 and 9) formed by stamping out the sheet material at 13 (Figures 2 and 7) to provide spaced sockets for a purpose that will hereinafter appear.

Within the channel member or guide 6 and extending longitudinally thereof are a pair of clamping jaws 14 for the edge of the screen. They are each preferably of sheet metal in the form shown in Figure 11. Their outer edges are curled back to form smooth beads 15 constituting cam surfaces adapted to co-operate with the cam surfaces 11 on the channel guide. When these jaws are released as in Figure 7, the screen is free to slide freely between them. When they are moved inwardly with a parallel motion to the position shown in Figure 8, the beads engage the cam surfaces 11 and are pressed together with a spring pressure due to a slight expansion of the channel member, so that they not only grip the screen but pull laterally in a direction away from the center, so that it is stretched and, there being jaws at both sides, the body of the screen is disposed in a flat expanse. Reversal of this bodily movement of the jaws, of course, releases the screen and restores its freedom as in Figure 7.

The mechanism for effecting and controlling this movement of the jaws 14 is best illustrated in Figures 3, 4, 9, and 10. At upper and lower points on the walls 7 and 8 of the channel member cavities 16 are formed preferably by stamping out the sheet material. In these cavities are pivoted at 17 (Figures 5 and 6) links 18 that are also pivoted at 19 to and carry the jaws 14. When these links are raised as in Figure 5 by the upward movement of the jaws they throw the latter outwardly to released position, and when they are lowered as in Figure 6, they retract the jaws and cause the clamping action.

This longitudinal movement of the jaws which thus effects their bodily lateral and parallel movement is communicated and controlled by a bell crank hand lever 20 pivoted at 21 to the lower end of the channel member 6 adjacent to the sill A. When the screen is released from the jaws, this operating hand lever is in the vertical position of Figure 3. Pivoted to it at 22 is a link 23 carrying an actuating pin 24 that extends through the walls of the channel guides 6 from side to side and moves in vertical slots 25 therein, as shown additionally in section in Figure 10. This actuating pin also passes through horizontal slots 26 in the lower end of the jaw plates 14. Thus, when the hand lever 20 is depressed from the position of Figure 3 to the horizontal position of Figure 4 along the screen rail 5, the jaws are drawn down and clamped in screen engaging position whatever the position of the screen may be. It will be noted from Figure 4 that the pivot 22 passes slightly across the dead center line between the pivot 21 of the lever and the actuating pin 24, so that it locks and holds the jaws in operative position.

The main or body portion of the tubular rail 5 preferably ends adjacent to the guide. Projecting from its extremity into the channel member and guide 6 is a spring latch plate 25a shown in detail in Figure 15 (Sheet 1). This latch plate has longitudinal flanges 26a fitting closely the interior of the rail, and guided on the top and bottom walls thereof. A flange 27 at its outer end (see also Figure 10) is a locking flange. A flange 28 at its inner end is engaged by a spring 29 acting to normally thrust the latch outwardly. This causes the engaging flange 27 to lock in to any one of the sockets 13 that may be selected, and resting against the shoulder 12 on the interior of the channel, lock the screen in the closed position of Figure 4 or in an elevated position. In Figure 3 the rail 5 is shown between two of these positions, and the latch will engage automatically if the rail is moved either up or down.

It is desirable to have means in a screen of this character for forcing the bottom rail 5 down tightly against the sill A when in closed position. The same jaw operating hand lever 20 and actuator 24 is herein utilized for this purpose. When the lever and jaws are released as in Figure 3 and the rail 5 is pressed down to close the screen, the cam surface 30 on the under side of the latch plate 25a formed by the marginal slot 31 rides on the actuator pin 24 and retracts the latch against the tension of its spring until a shoulder 32 associated with the cam and formed by the same slot is permitted to snap into engagement below the actuator. The downward movement of the actuator on the closing of the screen gripping jaws will thus carry the rail down with it and lock it in addition to the engagement of the latch with the lowermost locking shoulder 12 on the channel guide.

Mechanism is provided in association with the rail 5 for retracting the spring latches 25a and also positively actuating them in both directions. In the present instance this mechanism is housed completely within the rail and is best shown in Figures 2, 12, 13 and 14. It comprises in the present instance a pinion 33 arranged centrally or at an intermediate point on the rail and secured to a tubular hub 34 having bearings in the walls of the rail. The interior of the hub is hexagonal or irregular to receive a similarly formed turning crank 35 that projects on the inside and is accessible for hand operation. It may also be detachable. Confined between the pinion 33 and the opposite wall of the rail at both top and bottom and meshing with the pinion is a rack 36 of the construction shown in Figure 14. At the end of each rack is pivoted a link or pull rod 37, the other end of which is connected to one of the latch plates 25a at 38. It will be seen that by turning the crank 35 to the right in Figure 2, the latch plates will be retracted and by turning it in the opposite direction they will be extended positively to operative positions with the assistance of the spring 29.

I claim as my invention:

1. In an edge clamp for movable flexible window screens, the combination with a pair of clamping jaws adapted to receive the edge of the screen between them, of means for closing the jaws upon the screen and means for forcing the jaws bodily in a direction away from the edge of the screen to stretch the latter.

2. In an edge clamp for movable flexible window screens arranged to be mounted on a support, the combination with a pair of clamping jaws adapted to receive the edge of the screen between them, of means for actuating the jaws bodily in a direction away from the center of the screen, there being a cam contact between the support and the jaws to close the latter upon the screen during such movement and to stretch the screen.

3. In an edge clamp for movable flexible window screens, the combination with a channel member presenting two spaced walls having cam surfaces thereon, of a pair of parallel clamping jaws arranged within the channel member and adapted to receive the edge of the screen between them, said jaws having cam contacting portions, and means for actuating said jaws inwardly and outwardly with reference to the channel member to grip and stretch the screen by the cam action, or to release the screen.

4 In an edge clamp for movable flexible window screens, the combination with a channel member, of a pair of parallel jaws within the channel member adapted to receive the edge of the screen between them, pivotal link supports for the jaws on the channel member giving them a lateral movement in a direction away from the screen edge when they are thrust longitudinally, cooperating cam surfaces on the channel member and jaws serving to bring them together to grip and stretch the screen during the said lateral movement of the jaws, and means for imparting a longitudinal thrust to the jaws.

5. In an edge clamp for movable flexible window screens, the combination with a channel member, of a pair of parallel jaws within the channel member adapted to receive the edge of the screen between them, pivotal link supports for the jaws on the channel member giving them a lateral movement in a direction away from the screen edge when they are thrust longitudinally, cooperating cam surfaces on the channel member and jaws serving to bring them together to grip and stretch the screen during the said lateral movement of the jaws, and means for imparting a longitudinal thrust to the jaws, comprising a lever arranged at the base of the channel member and pivotally connected to the jaws.

6. In a construction for mounting in a window frame embodying a sill and side pieces, channel members adapted to be secured to the side pieces and having vertical slots at their bases adjacent to the sill, and a pair of parallel horizontally slotted jaws within each channel member adapted to receive an edge of a screen between them, pivotal link supports for the jaws on the channel members giving them a lateral movement in a direction away from the center of the screen when they are thrust longitudinally, cooperating cam surfaces on the channel members and jaws serving to bring them together to grip and stretch the screen during said lateral movement of the jaws, and a hand lever pivoted on each channel member near its base and having a link connection with the jaws to actuate them longitudinally, said link connection embodying actuating pins slidable in the before mentioned slots of the jaws and channel members.

7. In a construction for mounting in a window frame embodying a sill and side pieces, channel members adapted to be secured to the side pieces and having vertical slots at their bases adjacent to the sill, and a pair of parallel horizontally slotted jaws within each channel member adapted to receive an edge of a screen between them, pivotal link supports for the jaws on the channel members giving them a lateral movement in a direction away from the center of the screen when they are thrust longitudinally, cooperating cam surfaces on the channel members and jaws serving to bring them together to grip and stretch the screen during the said lateral movement of the jaws, a hand lever pivoted on each channel member near its base and having a link connection with the jaws to actuate them longitudinally, said link connection embodying actuating pins slidable in the before mentioned slots of the jaws and channel members, and a base rail for the screen guided in the channel members and provided with latches having snap engagement with the actuating pins of the hand levers whereby said pins may also act to force the rail against the sill.

8. In a construction for mounting in a window frame embodying a sill and side pieces, guides on the side pieces, a screen having a bottom rail movable in the guide, an actuating device adapted to engage the rail and to force the latter against the sill, and a hand lever pivoted on the base of a guide and operatively connected to the actuating device.

9. In a construction for mounting in a window frame embodying a sill, lateral guides rising from the latter, a screen having a bottom rail movable in the guides, an actuating device movable on one of the guides, and a spring latch on the rail adapted to engage the actuating device and permit the latter, when operated, to force the rail against the sill.

10. In a construction for mounting in a window frame embodying a sill, lateral guides rising from the latter, a screen having a bottom rail movable in the guides, an actuating device movable on one of the guides, and a spring latch on the rail embodying a shoulder and a cam associated therewith adapted to interlock the shoulder and actuating device when the screen rail is lowered and permit the actuating device, when operated, to force the rail against the sill.

11. In a construction for mounting in a window frame embodying a sill, lateral guides rising from the latter, a screen having a bottom rail embodying spring latches at its ends adapted to lock in the guides as the screen is raised to different heights, and means, automatically engaged by the latches, for forcing the rail against the sill when the screen is lowered.

12. In a construction for mounting in a window frame embodying a sill, lateral guides rising from the latter, a screen having a bottom rail embodying spring latches at its ends adapted to lock in the guides as the screen is raised to different heights, means, automatically engaged by the latches, for forcing the rail against the sill when the screen is lowered, and means for retracting the latches including a hand operating member arranged on the rail intermediate the latches.

13. The combination with a window frame embodying a sill, lateral guides rising from the sill, each embodying a channel member comprising opposite walls composed of separate sheet metal strips having bosses stamped out therefrom at intervals forming internal shoulders, of a screen having a bottom rail provided with spring latches at its ends travelling in the guides, said latches being adapted to engage the shoulders, selectively, to maintain the screen rail in different elevated positions.

14. In a construction for mounting in a window frame embodying a sill, lateral guides rising from the latter, a screen having a hollow bottom rail embodying spring latches sliding therein and engaging the guides to lock therein at different heights, a pinion located at an intermediate point within the rail, exteriorly arranged means for turning the pinion, racks meshing with opposite sides of the pinion and held thereby in sliding engagement with opposite walls of the rail, and links connecting the racks and latches for retracting the latter.

15. In a construction for mounting in a window frame embodying a sill; lateral guides rising from the latter embodying rail clamping jaws, a flexible screen having its edges guided between the jaws and provided with a bottom rail and a common actuator for operating the jaws and for forcing the screen rail against the sill.

16. Window screen retaining means comprising clamps located at the sides of the screen, means to cause the clamps to grip the sides of the screen to retain the latter in a screening position, the clamp on at least one side of the screen being laterally movable, and means for moving said clamp laterally while gripping the screen for stretching the latter and for retaining the clamp to keep the screen stretched laterally.

17. Window screen retaining means comprising laterally movable clamps located at the sides of the screen, means to cause the clamps to grip the sides of the screen to retain the latter in a screening position, and means to move the clamps laterally with the screen for stretching the screen while gripped by the clamps.

18. An edge clamp for movable window screens for mounting on a frame, comprising in combination a channel portion formed in halves to constitute a guide and embodying spaced walls to receive the screen edge and superposed flange portions extending from said spaced walls, and fastening devices securing said flange portions to the outer face of the frame.

ALVIN F. NYE.